United States Patent Office 2,810,408
Patented Oct. 22, 1957

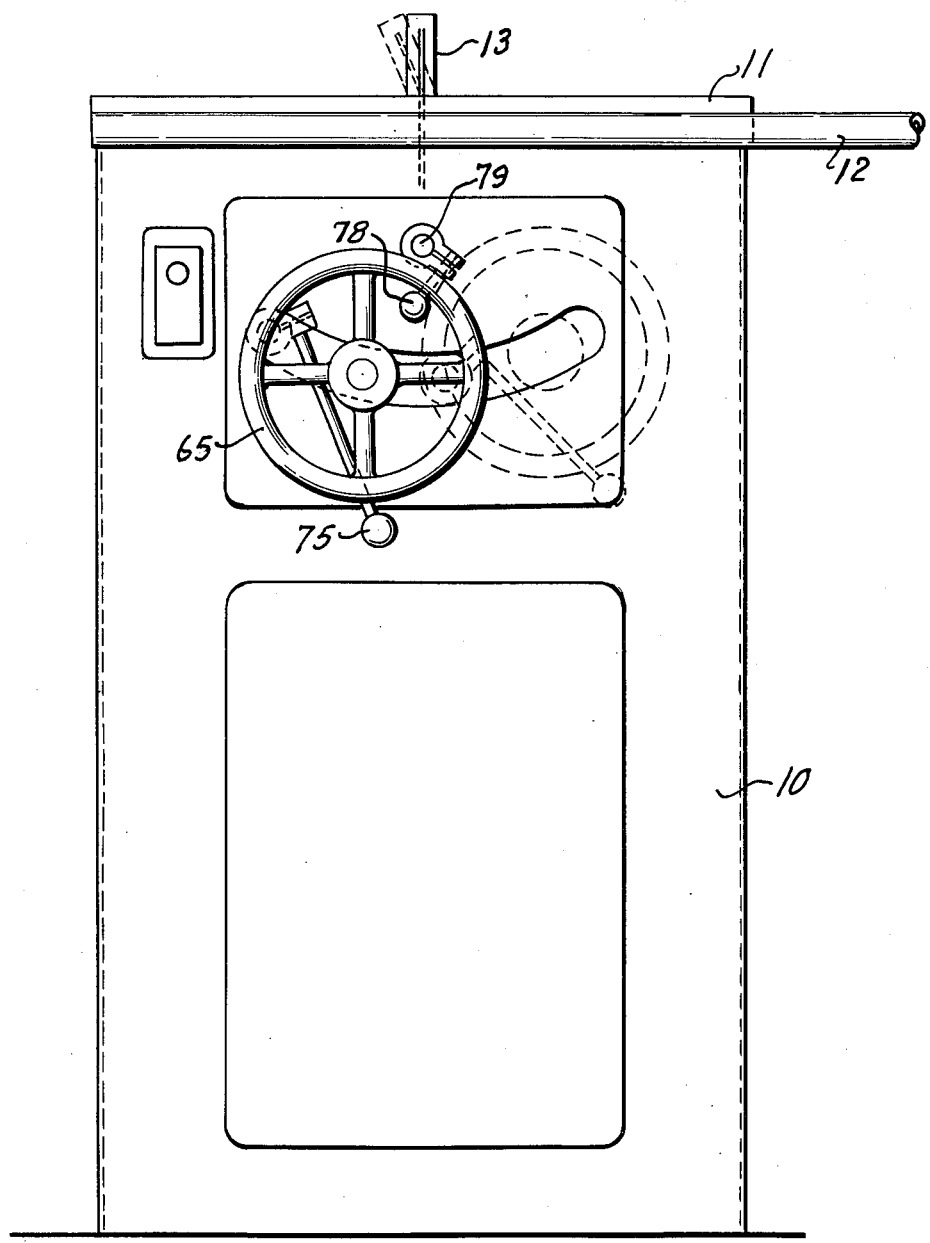

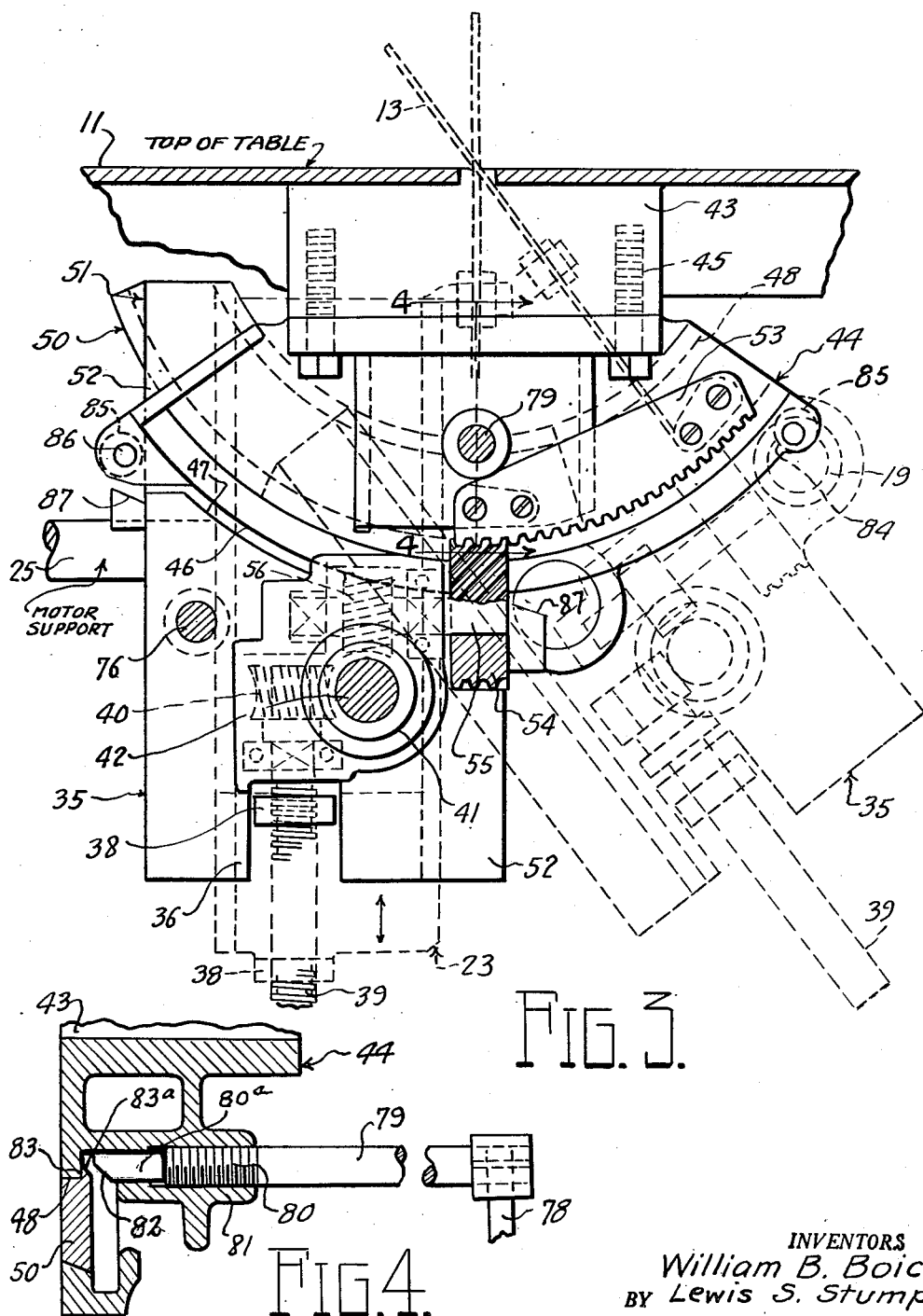

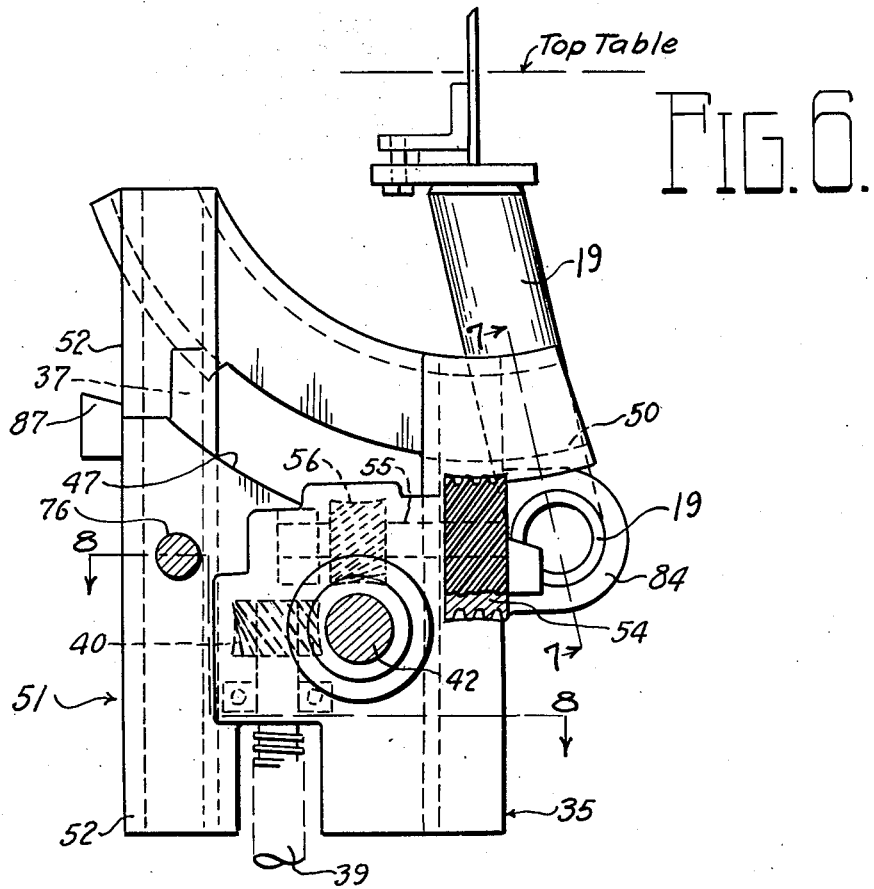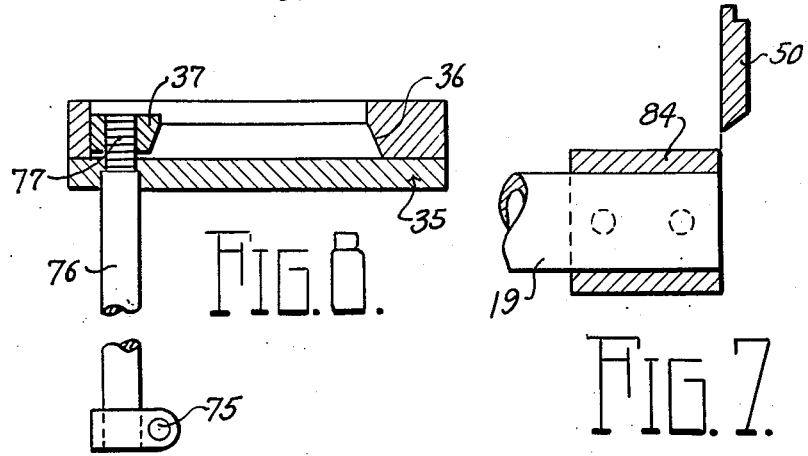

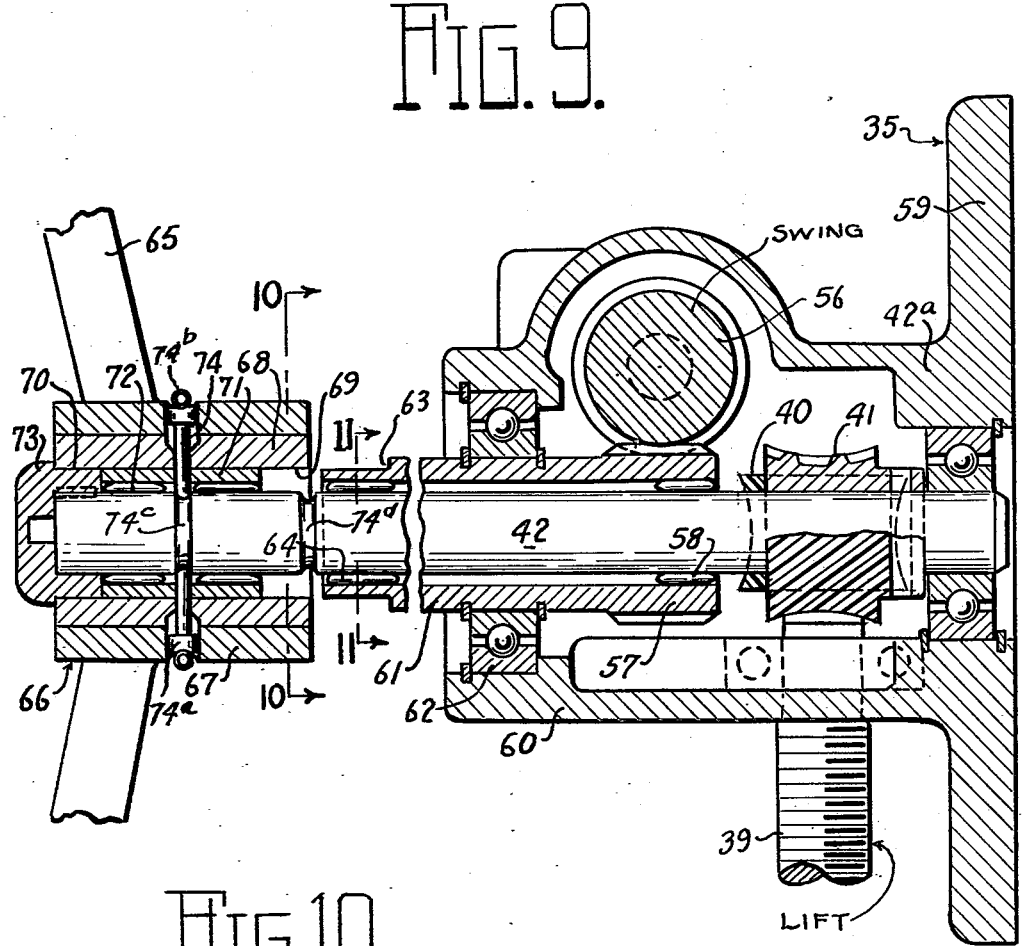
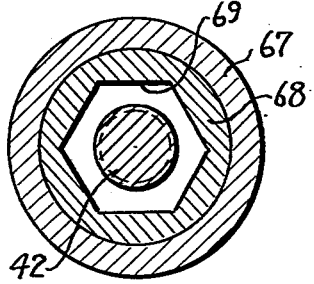
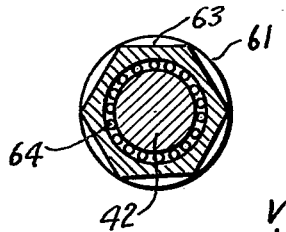

2,810,408

ADJUSTABLE MOUNTING AND DRIVE MECHANISM FOR TABLE SAWS

William B. Boice and Lewis S. Stump, Toledo, Ohio, assignors to Boice-Crane Company, Toledo, Ohio, a corporation of Ohio Application June 11, 1954, Serial No. 436,102

1 Claim. (Cl. 143—36)

This invention relates to power operated circular saws but more particularly to saws which can be adjusted upwardly and downwardly and also can be tilted relative to the work surface.

An object is to improve and simplify mechanisms of this character enabling them to operate more efficiently and to be constructed with less parts.

Another object is to produce new and improved controls for tilting, up and down movements and locking and arrange same conveniently on the same side of the machine.

Another object is to produce a carrier unit having the saw blade, operating motor and drive connections so constructed and arranged that the weight of the unit urges dove-tail surfaces together so as to maintain a rigid mechanism at all times.

A further object is to mount the saw guard so that it automatically tilts with the saw but does not move up and down with the saw.

A still further object is to produce a mechanism of the above character which is simple in construction; easy to assemble; rugged and rigid at all times; economical to manufacture; and has the unique features of construction, assembly and operation hereinafter described.

Other objects and advantages of the invention will hereinafter appear and for purposes of illustration, but not of limitation, an embodiment of the invention is shown on the accompanying drawing, in which Figure 1 is a side elevation of a circular saw machine which is capable of up and down movements as well as tilting adjustments;

Figure 2 is a front end elevation of the machine shown in Figure 1;

Figure 3 is a vertical sectional view on an enlarged scale taken substantially on the line 3—3 of Figure 1;

Figure 4 is an enlarged sectional view substantially on the line 4—4 of Figure 3;

Figure 6 is a front elevation of the tilting assembly;

Figure 7 is a sectional view substantially on the line 7—7 of Figure 6;

Figure 8 is a transverse sectional view substantially on the line 8—8 of Figure 6;

Figure 9 is an enlarged longitudinal sectional view of the gear case which forms part of the tilting assembly and showing the manual operating means for effecting the raising or lowering movement for the saw as well as the tilting adjustment;

Figure 10 is a transverse sectional view on the line 10—10 of Figure 9; and

Figure 11 is a transverse sectional view substantially on the line 11—11 of Figure 9.

Figure 1:
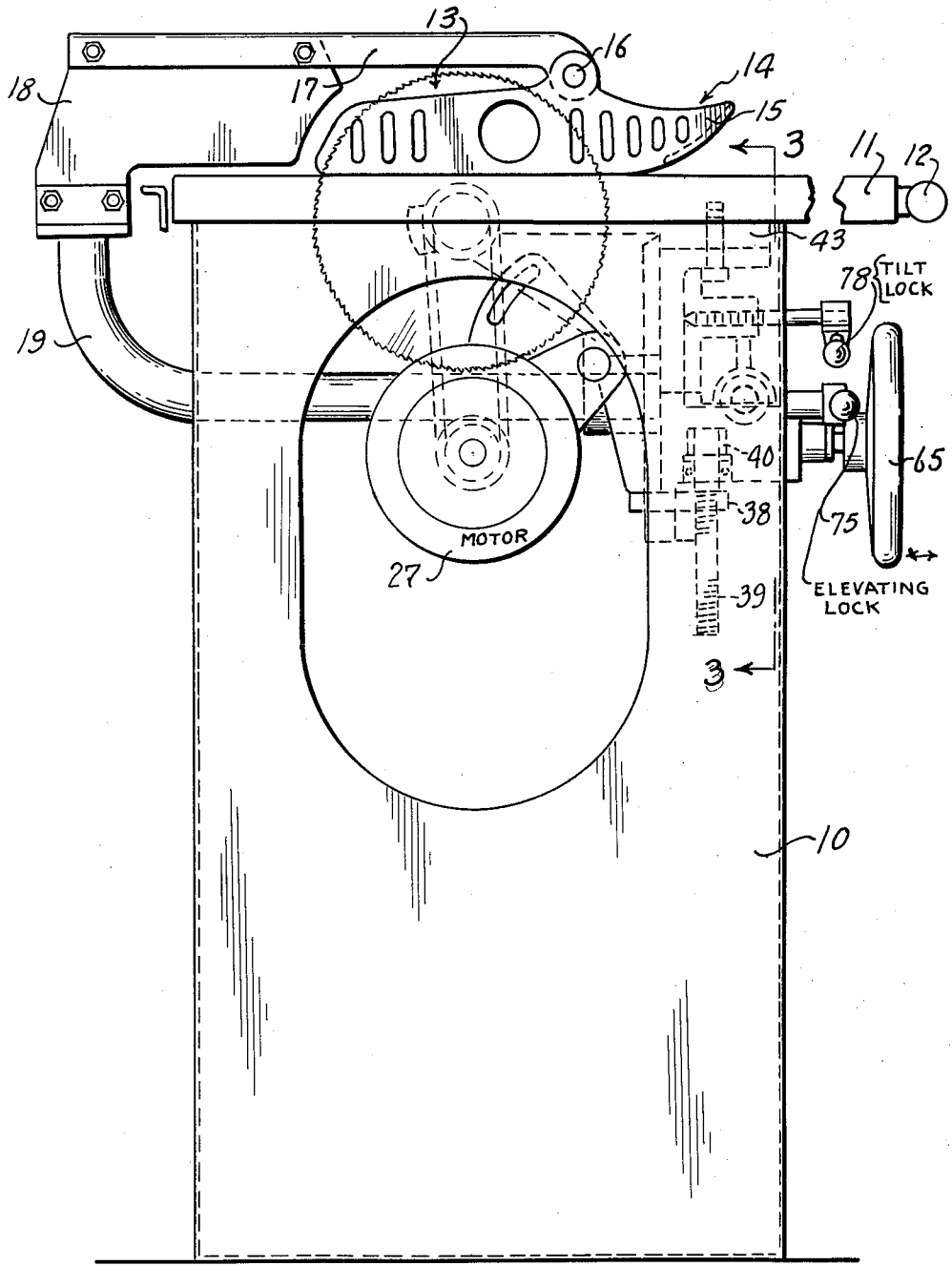

The illustrated embodiment of the invention comprises a rectangular upright cabinet base 10 of sheet metal within which is disposed the operating mechanism and on the top of which is a suitable work table 11. Along one side, particularly the operator's, of the cabinet is a horizontally disposed fence supporting tube or way bar on which a fence is mounted, the fence being omitted from the drawing, since it forms no part of the present invention. With a portion projecting upward through a slot in the work table 11 is a circular saw blade 13 and on top of the work table is a saw guard, generally indicated at 14, which comprises an inverted U-shaped member 15 joined at the front end by a partition wall and pivoted intermediate its end at 16 to an arm 17 U-shaped in cross section. The rear end portion of the arm 17 straddles and is fastened to a vertically disposed plate or splitter 18, a portion of which lies over the work table at substantially right angles thereto. The rear portion of the splitter 18 projects outwardly beyond the work table, and is rigidly fixed to a substantially L-shaped supporting tube 19 which projects through an opening in a side wall of the cabinet 10 and into the interior thereof. The mounting of the splitter and saw guard supporting tube 19 will be hereinafter described.

Figure 5:
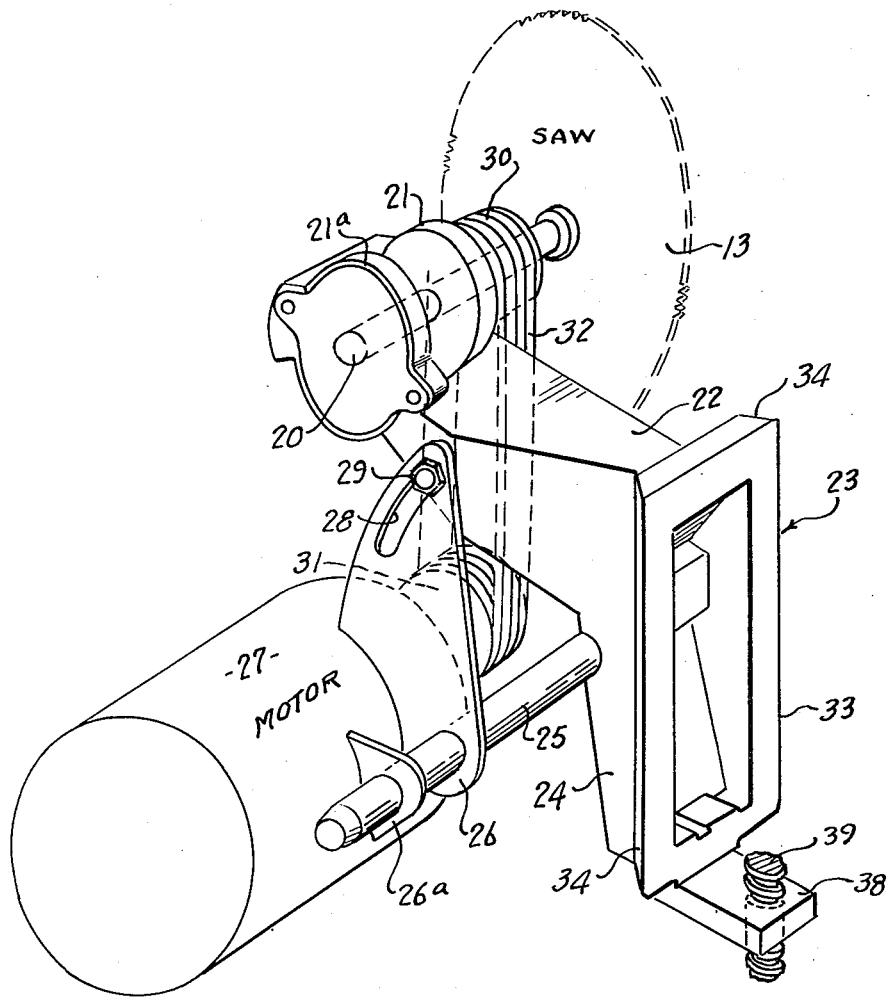
Figure 5 is a perspective view of the saw assembly showing the power means for driving the saw and the mounting for the motor and saw shaft.

The circular saw blade 13 is suitably fixed to one end of a driven shaft or arbor 20 (Figure 5), which is mounted for rotation in a pair of laterally spaced antifriction bearing units 21 and 21a, suitably fixed to a horizontally disposed arm 22 of an L-shaped carrier or support 23 which has an integral vertically disposed arm 24. As shown, the saw blade is disposed at one side of the horizontally disposed arm 22.

Rigid with the upper portion of the vertical arm 24 of the support 23 and projecting laterally therefrom is a motor supporting rod 25 on which are rockably mounted a pair of laterally spaced bracket plates 26 and 26a rigid with and projecting outwardly from an electric motor 27. The bracket plate 26 is of substantial size and extends outwardly from the motor housing a substantial distance. This bracket plate is generally triangular in shape and in the apical portion is a vertically disposed arcuate slot 28 into which projects a stud and nut assembly 29, the stud being rigid with and projecting from the horizontal arm portion 22 of the support. For driving the saw 13 from the electric motor, a series of V belt sheaves 30 are fixed to the arbor 22 at one side of the support arm 22. On the projecting end of the electric motor armature is a series of V belt sheaves 31 and trained over the sheaves 30 and 31 are V belts 32, thereby effecting the drive from the motor to the saw blade 13, as will be readily understood. Since the electric motor 27 is rockably mounted on the rod 25, the motor acts as a tightener for the belts 32 and this is accomplished through the agency of the arcuate slot 28 and stud connection 29 above mentioned.

The vertical arm 24 of the support is hollow and has a substantially rectangular enlarged end portion indicated at 33, providing a pair of laterally spaced oppositely inclined guide surfaces or sides of a dovetail 34. It will be understood that the inclination of the guide surfaces 34 is such that the weight of the motor 27 urges these surfaces intimately into contact with their mating surfaces, as will hereinafter be described. Thus the weight motor and associated parts acts to urge the dovetail surfaces toward each other and into intimate engagement instead of urging them apart, thereby contributing to the rigidity of the machine and the smooth vertical adjustment of the saw assembly, as will be hereinafter more fully described.

Not only is the saw blade capable of up and down adjustment, but also tilting adjustment. The assembly which makes possible the tilting adjustment comprises an assembly, generally indicated at 35 (Figures 3 and 6). The assembly 35 has a pair of laterally spaced, vertically disposed ways 36 to receive the dovetail or oppositely inclined guide surfaces 34 of the casting 23. Forming one side of the ways 36 is a separate gib strip 37 which can be tightened for locking the parts against up and down movement, as will hereinafter appear. When the saw blade is adjusted vertically, the tilting assembly 35 remains stationary. For effecting the vertical adjustment of the saw, there is an outwardly extending integral lug 38 (Figure 5) on the lower end of the vertical arm 24 of the casting 23. This lug is screw-threaded to receive a vertical screw shaft 39 mounted on suitable bearings on the tilting assembly 35. On the opposite end of the shaft 39 is a helical gear 40 which meshes with a helical gear 41 (Figure 9) fixedly mounted on a horizontally disposed manually operated shaft 42, the inner end of which is mounted in an anti-friction bearing 42a. Further description of the shaft 42 and associated parts will be given later on.

An upwardly curved open ended trunnion 44 (Figures 3 and 4) is secured by bolts 45 to a pad 43 which is fixed to and depends from the underside of the work table 11. The lower edge of the trunnion 44 is curved, as indicated at 46, and is spaced slightly from the correspondingly curved portion 47 of the tilting assembly 35. In the trunnion 44 is an upwardly curved, open ended guideway 48 and slidable in this guideway is an arcuate male member 50. One of the meeting edges of the member 50 and also the adjacent guideway are inclined or dovetailed as shown. The other edge of the male member 50 has a right angle edge and a laterally projecting flange 83 which has an exteriorly beveled surface 83a.

Forming part of the tilting assembly 35 is a casting 51, which is fixed to the rear face of the arcuate male member 50 and has a pair of vertically disposed laterally spaced legs 52 provided with the guideways 36 above mentioned.

Fastened to the trunnion 44 is a toothed sector 53, the teeth of which are arcuately disposed. Meshing with the teeth on the sector 53 is a worm 54 which is fixed to a relatively short shaft 55 for turning movements therewith. The shaft 55 is mounted in suitable bearing brackets and also fixed to the shaft for turning movements therewith is another helical gear 56 somewhat smaller than the gear 54. The gear 56 meshes with a gear 57 (Figure 9). The gear 57 is mounted on needle bearings 58 so as to reduce friction as much as possible. Further description of this drive will hereinafter appear.

Also forming part of the tilting assembly 35 is another casting 59 which bolts to the front of the casting 51. The casting 59 carries the gearing particularly as shown in Figure 9. Forming a part of the casting 59 is a gear housing 60 and rotatable within the housing 60 is an elongate sleeve 61 which rotates in anti-friction bearings 62. The sleeve 61 is arranged outside of the horizontal shaft 42, the needle bearings 58 being disposed between the shaft 42 and the sleeve 61. Between the outer end of the sleeve 61 and the shaft 42 are needle bearings 64. Thus it will be apparent that the sleeve 61 is mounted at one end on needle bearings 58 and at the opposite end on needle bearings 64. The outer end of the sleeve 61 is reduced and is of hexagonal shape, particularly as indicated on Figure 11.

A hand wheel is indicated at 65 and has a hub assembly 66 which includes a sleeve 67 to which is fixed an inner sleeve 68. A hexagonal shaped socket 69 is disposed at the inner end of the assembly and is of such a size and shape as to slide over the hexagonal end portion 63 of the sleeve 61. Thus by shifting the hand wheel 65 inwardly the hexagonal socket 69 moves into engagement with the hexagonal sleeve end 63 so that by turning the hand wheel 65 the sleeve 61 is accordingly turned. As above pointed out, turning the sleeve 61 imparts turning movement to the gear 57 and thence through the gear 56, shaft 55, gear 54, and the gear sector 53, which thereby affords the tilting movement to the trunnion 44 and the saw assembly shown in Figure 5.

Disposed somewhat centrally of the fixed sleeve 68 is a bearing sleeve 71 and intermediate the bearing sleeve 71 and the horizontal shaft 42 are needle bearings 72 arranged in two sets. Pins 74 having enlarged heads 74ª are slidable radially in suitable apertures in the sleeves 67, 68 and 71. An annular spring 74b urges the pins 74 radially into either of the grooves 74c or 74d in the shaft 42, thereby releasably to retain the hub assembly 66 in the selected position of adjustment.

On the outer end of the hub sleeve 68 is an hexagonal socket 70. Fitting over the outer end of the shaft 42 is a cap 73 of sleeve-like form, the sleeve portion being of hexagonal shape so that the socket portion 70 of the wheel hub can be shifted axially to slide over the hexagonal portion 73 so that turning of the wheel 65 thus effects turning movement of the shaft 42. Such turning movement is, as above pointed out, imparted to the gears 41, 40 and finally to the vertical screw shaft 39 which effects the raising or lowering of the saw assembly.

From the above description it will be manifest that by pushing the hand wheel 65 inwardly the saw and associated parts are tilted in one direction or the other depending upon the direction that the hand wheel 65 is rotating. Raising or lowering of the saw assembly is accomplished by pulling outwardly on the hand wheel 65 so that positive connection is effected for actuating the shaft 42, and the direction of rotation determines the vertical direction of movement.

Arranged at the front of the machine adjacent the hand wheel 65 is a locking device for the tilting adjusting movement for the saw blade. For this purpose a lever 78 is fixed to the outer end of a horizontal shaft 79, which as shown in Figure 4 has a screw-threaded end portion 80 engaging the trunion 44. The inner end portion of the shaft 79 engages a sliding member 80a which has a cam 82 engageable with a surface 83a for jamming the part 50 against the guideways thereby positively locking it from movement.

Means is also provided for holding the saw against up and down movement, and for this purpose an operating lever 75 also disposed at the front of the machine. Adjacent the hand wheel 65 is a shaft 76 (Figure 8) to which the lever 75 is secured and the end portion of the shaft is in screw-threaded engagement with the gib 37 so that by tightening the shaft, the gib binds securely against the adjacent dovetail surface 34 of the motor support 23 and thus prevents the assembly 23 from moving upwardly or downwardly.

The inner end of the guard and splitter supporting tube 19 is fixedly mounted in a boss 84 (Figure 6) which is integral with one of the legs 52 of the tilting assembly. Thus it will be manifest that the saw guard and associated parts tilt with the saw assembly but do not move up and down as the saw assembly moves.

At opposite sides of the trunnion 44 are downwardly inclined ears 85 (Figure 3) in which are eccentric rollers 86 which are engageable with cam surfaces 87 respectively on the tilting assembly, thus providing adjustable stops for limiting the rocking movement of the assembly.

From the above it will be manifest that we have produced an exceedingly satisfactory circular saw mechanism, which can be readily and conveniently adjusted upwardly or downwardly as well as tilted one way or the other. The controls are conveniently located at the front of the machine where the hand wheel makes possible the saw blade adjustment and the nearby levers enable either the tilting assembly to be securely located or the carrier fastened against adjusting movements. By locking both adjustments, free motion is eliminated from all the gibs and ways and the control mechanism becomes one solid unit from the saw arbor to the table top. This makes for more accurate sawing as well as quiet operation, and is an extremely important feature from a practical standpoint.

Numerous changes in details of construction, arrangement and operation may be effected without departing from the spirit of the invention especially as defined in the appended claim.

What we claim is:

A circular saw mechanism comprising a saw table having front and rear portions, a single trunnion depending from said front portion and lying therebeneath, a frame carried by said trunnion, said frame being tiltable on said trunnion about a horizontal axis extending fore and aft of the table, a laterally spaced pair of dovetail ways extending generally vertically on said tiltable frame, an inverted L-shaped member having a leg portion adapted to extend generally vertically and a stem portion adapted to extend horizontally, said leg portion having a pair of laterally spaced slide surfaces extending generally vertically along opposite sides thereof, said slide surfaces being in dovetail engagement with the dovetail ways on the tiltable frame, means operable by a shaft and handwheel carried by the tiltable frame engaging the trunnion for adjusting the frame about said horizontal axis and means operable by said shaft and handwheel for adjusting the L-shaped member generally vertically along the dovetail slide, the stem portion extending rearwardly beneath the saw table with the free end thereof terminating generally centrally beneath the saw table, a saw assembly including a saw, shaft, and shaft bearing supported on the stem portion substantially at the free end thereof, a motor suspended on said member substantially beneath the free end of the stem portion, drive gearing including a belt and sheaves connected between said motor and shaft, the motor, saw assembly and drive gearing being offset rearwardly a substantial distance from said ways and trunnion, thereby tending to exert binding forces between the slide surfaces and the dovetail ways and between the tiltable frame and the trunnion so as to hold the L-shaped member and tiltable frame temporarily in adjusted position, and separate means for locking said member and tiltable frame in adjusted position.

References Cited in the file of this patent

UNITED STATES PATENTS

| | | |
|---|---|---|
| 1,314,291 | Wallace | Aug. 26, 1919 |
| 1,380,707 | Fehrm | June 7, 1921 |
| 1,446,726 | Sloan | Feb. 27, 1923 |
| 1,821,113 | Neighbour | Sept. 1, 1931 |
| 1,922,151 | Boice et al. | Aug. 15, 1933 |
| 2,008,673 | Ocenasek | July 23, 1935 |
| 2,038,810 | Tautz | Apr. 28, 1936 |
| 2,085,131 | Tautz | June 29, 1937 |
| 2,121,069 | Collins | June 21, 1938 |
| 2,131,492 | Ocenasek | Sept. 27, 1938 |
| 2,265,407 | Tautz | Dec. 9, 1941 |
| 2,294,272 | Boice | Aug. 25, 1942 |
| 2,577,206 | Patterson | Dec. 4, 1951 |
| 2,626,639 | Hess | Jan. 27, 1953 |
| 2,695,638 | Gaskell | Nov. 30, 1954 |